United States Patent Office 2,859,241
Patented Nov. 4, 1958

2,859,241

PRODUCTION OF VINYL ESTERS

Arthur W. Schnizer, Corpus Christi, Tex., assignor to Celanese Corporation of America, New York, N. Y., a corporation of Delaware No Drawing. Application February 15, 1956
Serial No. 565,552

8 Claims. (Cl. 260—491)

This invention relates to the production of vinyl esters and relates more particularly to the production of a plurality of vinyl esters simultaneously.

An important object of this invention is to provide an improved process by means of which it is possible simultaneously to produce two or more vinyl esters.

A further object of this invention is to provide an improved process for the production of two or more vinyl esters simultaneously by the reaction with acetaldehyde of a mixture containing one or more organic acid anhydrides and one or more organic acids.

Other objects of this invention will be apparent from the following detailed description and claims.

According to the present invention, acetaldehyde, whether substituted or not, is reacted with a mixture containing one or more organic acid anhydrides and one or more organic acids to produce ethylidene diesters. The said ethylidene diesters are then decomposed to yield directly a mixture of vinyl esters in which the acyl radicals are those of the organic acid anhydrides and also those of the organic acids. In this way, it is possible to produce simultaneously two or more vinyl esters in a single reaction line in almost any desired proportions. This permits the achievement of important economies in the production of the vinyl esters, particularly where small quantities of certain esters are desired together with larger quantities of other esters.

In carrying out the process of this invention, there are entered into a reactor acetaldehyde and a mixture containing at least one organic acid anhydride and at least one organic acid. The reaction will take place, to some extent, with almost any proportion of reactants. However, for best results there should be present for each mol of the acetaldehyde, between 1 and 10 mols or, preferably between 2 and 4 mols of organic acid anhydride. The quantity of organic acid should range from about 0.05 to 1.0 mol or, preferably, 0.2 to 0.4 mol, for each mol of organic acid anhydride. The reaction producing the ethylidene diester is normally carried out in the presence of an acid catalyst such as, for example, sulfuric acid and alkanesulfonic acids. A particularly valuable class of catalysts for this purpose are the aromatic sulfonic acids such as benzenesulfonic acid, toluenesulfonic acid, ethylbenzenesulfonic acid, xylenesulfonic acid and naphthalenesulfonic acid as set out more fully in Oxley et al., U. S. Patent No. 2,425,389. The quantity of catalyst should range between 0.01 and 1.0% by weight, based on the weight of the mixture. The reaction is carried out at a temperature between 120 and 160° C. and will normally require from 0.5 to 2.0 hours to go to completion.

Organic acid anhydrides that may be employed are, for example, the anhydrides of acetic acid, propionic acid, butyric acid and pentanoic acid. It is preferred, however, to employ acetic anhydride since it is the most readily available and least expensive of the anhydrides commercially available at the present time. During the reaction, a portion of the acetic anhydride will be converted to acetic acid. The acetic acid so formed may be readily recovered and converted back again to the anhydride at a minimum cost in a manner well known in the art. Organic acids that may be employed are acetic acid, propionic acid, butyric acid and pentanoic acid. The acid should, of course, have an acyl radical different from that of the anhydride.

The ethylidene diesters are then converted to vinyl esters by decomposition in the presence of an acid catalyst. Preferably, there is employed a sulfonic acid catalyst as described in the Oxley et al. patent referred to above. The amount of catalyst should range between 0.1 and 1.0% by weight, based on the weight of reaction mixture. The decomposition of the ethylidene diesters to vinyl esters proceeds with the maximum efficiency when there is present, for each mol of the ethylidene diesters, at least 0.5 and, preferably, at least 1.5 mols, of organic acid anhydride to minimize the decomposition of the ethylidene diesters to acetaldehyde and anhydride. To cause the decomposition to proceed, there should be employed temperatures of at least 130° C. and, preferably, at least 140° C. The best results are obtained when the reaction is carried out in such a manner that the vinyl esters are removed from the reaction zone, by distillation or the like, as they are formed. The reaction mixture may also contain a small proportion of a suitable polymerization inhibitor to prevent polymerization of the vinyl esters being produced. After the vinyl esters have been removed from the reaction zone, they may be separated from one another as by fractional distillation or the like.

The process of this invention may be carried out on a batch basis or in a continuous manner as desired. It is preferred to carry out the production of the ethylidene diesters and the conversion of said ethylidene diesters into vinyl esters in a single reactor. However, it is also possible to operate the process on a two-step basis. That is, the reaction to produce the ethylidene diesters is first carried out and the said ethylidene diesters are then converted to vinyl esters.

The following examples are given to illustrate this invention further.

*Example I*

There is introduced into a reactor 2650 parts by weight of acetic anhydride, 185 parts by weight of propionic acid, 1050 parts by weight of acetaldehyde (as paraldehyde), and 20 parts by weight of benzene sulfonic acid and the reactor is brought to the boiling point (139–142° C.). The vapors from the reactor are fed directly to the 30th plate of a 60 plate distillation column operated at 5:1 reflux ratio, a base temperature of 140° C. and a head temperature of 90–100° C. There is continuously introduced into the column a stream of 25 parts by weight of acetaldehyde per hour and 63 parts by weight of acetic anhydride per hour and the heat input to the reactor is adjusted so that the level of the liquid therein remains constant. The material withdrawn from the base of the distillation column is recycled to the reactor. The material taken overhead from the distillation column at the start of operations contains vinyl acetate and vinyl propionate in a mol ratio of 25 to 1. Material balance calculations show that the efficiency of conversion of the acetaldehyde to vinyl esters and the efficiency of conversion of acetic anhydride to vinyl acetate is high, being of the order of 80–90%, and the efficiency of conversion of propionic acid to vinyl propionate is nearly 100%.

*Example II*

There is introduced into a reactor 3060 parts by weight of acetic anhydride, 211 parts by weight of butyric acid, 528 parts by weight of acetaldehyde (as paraldehyde), and 21 parts by weight of benzene sulfonic acid and the reactor is brought to the boiling point (139–142° C.). The vapors from the reactor are fed directly to the 30th plate of a 60 plate distillation column operated at 5:1 reflux ratio, a base temperature of 140° C. and a head temperature of 95–100° C. There is continuously introduced into the column a stream of 42 parts by weight of acetaldehyde per hour and 58 parts by weight of acetic anhydride per hour and the heat input to the reactor is adjusted so that the level of the liquid therein remains constant. The material withdrawn from the base of the distillation column is recycled to the reactor. The material taken overhead from the distillation column at the start of operations contains vinyl acetate and vinyl butyrate in a mol ratio of 30 to 1. Material balance calculations show that the efficiency of conversion of the acetaldehyde to vinyl esters and the efficiency of conversion of acetic anhydride to vinyl acetate is high, being of the order of 80–90%, and the efficiency of conversion of butyric acid to vinyl butyrate is nearly 100%.

It is to be understood that the foregoing detailed description is merely given by way of illustration and that many variations may be made therein without departing from the spirit of my invention.

Having described my invention, what I desire to secure by Letters Patent is:

1. Process which comprises reacting acetaldehyde with a mixture of at least one lower alkanoic anhydride and at least one lower alkanoic acid having an acyl radical different from said anhydride to produce ethylidene diesters, and decomposing said ethylidene diesters to obtain a mixture of vinyl esters, one of said vinyl esters having its acyl radical derived from the lower alkanoic anhydride and another of said vinyl esters having its acyl radical derived from the lower alkanoic acid.

2. Process which comprises reacting acetaldehyde with a mixture of at least one lower alkanoic anhydride and at least one lower alkanoic acid having an acyl radical different from said anhydride in the presence of an acid catalyst at an elevated temperature to produce ethylidene diesters, there being present for each mol of acetaldehyde between 1 and 10 mols of anhydride and for each mol of anhydride between 0.05 and 1 mols of lower alkanoic acid, and decomposing said ethylidene diesters to obtain a mixture of vinyl esters, one of said vinyl esters having its acyl radical derived from the lower alkanoic anhydride and another of said vinyl esters having its acyl radical derived from the lower alkanoic acid.

3. Process which comprises reacting acetaldehyde with a mixture of acetic anhydride and at least one lower ankanoic acid having an acyl radical different from said anhydride at a temperature ranging between 130° C. and 160° C. and in the presence of 0.1 to 1.0% by weight of the entire mixture of an aromatic sulfonic acid catalyst, there being present for each mol of acetaldehyde between 1 and 10 mols of acetic anhydride and for each mol of acetic anhydride between 0.05 and 1.0 mols of lower alkanoic acid, to obtain a mixture of vinyl acetate and another vinyl ester having its acyl radical derived from the lower alkanoic acid.

4. Process which comprises reacting acetaldehyde with a mixture of at least one lower alkanoic anhydride and at least one lower alkanoic acid having an acyl radical different from said anhydride in the presence of a condensation catalyst to produce ethylidene diesters.

5. Process which comprises reacting acetaldehyde with a mixture of acetic anhydride and at least one lower alkanoic acid having an acyl radical different from said anhydride at a temperature ranging between 120° C. and 160° C. and in the presence of 0.01 to 1.0% by weight of the entire mixture of an aromatic sulfonic acid catalyst to produce ethylidene diesters, there being present for each mol of acetaldehyde between 1 and 10 mols of acetic anhydride and for each mol of acetic anhydride between 0.05 and 1.0 mols of lower alkanoic acid.

6. Process which comprises reacting acetaldehyde with a mixture of acetic anhydride and propionic acid in the presence of 0.01 to 1% by weight of the entire mixture of a benzenesulfonic acid catalyst and at a temperature ranging from about 120° C. to 160° C. to produce ethylidene diesters, there being present for each mol of acetaldehyde between 2 and 4 mols of acetic anhydride and for each mol of acetic anhydride between 0.2 and 0.4 mols of propionic acid.

7. Process which comprises reacting acetaldehyde with a mixture of acetic anhydride and butyric acid in the presence of 0.01 to 1.0% by weight of the entire mixture of a benzenesulfonic acid catalyst and at a temperature ranging from about 120° C. to 160° C. to produce ethylidene diesters there being present for each mol of acetaldehyde between 2 and 4 mols of acetic anhydride and for each mol of acetic anhydride between 0.2 and 0.4 mols of butyric acid.

8. In the process wherein acetaldehyde is reacted at elevated temperature with from about 1 to 10 times the molar amount of a lower alkanoic anhydride in the presence of an acidic condensation catalyst to form ethylidene diacetate and said ethylidene diacetate is decomposed to form the vinyl ester of the acyl radical of said anhydride, the improvement which comprises incorporating with said acetaldehyde and anhydride, a lower alkanoic acid having an acyl radical different from said anhydride, there being present between about 0.05 and 1.0 mol of said lower alkanoic acid for each mol of anhydride, whereby the vinyl ester of said lower alkanoic acid will be formed simultaneously with said vinyl ester of the acyl radical of said anhydride.

References Cited in the file of this patent

UNITED STATES PATENTS

| | | |
|---|---|---|
| 2,021,698 | Perkins | Nov. 19, 1935 |
| 2,425,389 | Oxley et al. | Aug. 12, 1947 |
| 2,432,394 | Dickey et al. | Dec. 9, 1947 |
| 2,513,090 | Finch et al. | June 27, 1950 |